United States Patent Office 3,208,965
Patented Sept. 28, 1965

3,208,965
PROCESS FOR PREPARING HOMO- AND COPOLYMERS OF VINYL CHLORIDE IN AN AQUEOUS EMULSION AND SUBSEQUENTLY SPRAY DRYING THE LATEX
Gerhard Kühne, Burghausen, Upper Bavaria, Germany, assignor to Farbwerke Hoechst Aktiengesellschaft vormals Meister Lucius & Brüning, Frankfurt am Main, Germany, a corporation of Germany
No Drawing. Filed May 6, 1960, Ser. No. 27,243
Claims priority, application Germany, May 9, 1959, F 28,407; Jan. 23, 1960, F 30,380
9 Claims. (Cl. 260—30.6)

The present invention provides a process for preparing homo- and copolymers of vinyl chloride in an aqueous emulsion and subsequently spray drying the latex.

It is known to prepare homo- and copolymers of vinyl chloride in an aqueous emulsion in the presence of an emulsifier and to separate the polymer by spray drying the resulting latex. If it is desired to obtain a product which can be worked up with plasticizers to yield a paste care has to be taken during the polymerization that the latex particle size is on an average about 0.5 to 1.5μ. The tendency towards the formation of new particles is suppressed by a low concentration of the emulsifier or the use of an emulsifier that is not very active. By these known processes there can, however, at best be obtained latices having a polymer concentration of about 25%. When larger quantities of emulsifier are used the resulting polymers yield only pastes of low quality.

According to a method which is known as seed polymerization the monomer is introduced into a seed latex of a medium particle size and polymerized therein while stirring and while gradually adding small quantities of emulsifier which according to the degree of conversion amount to a certain percentage of the possible covering of the surface. In that process the outlay on plant is greater than in the normal batch process and, above all, the solid content of the latex is too low, for even if the mixture is stirred as vigorously as possible the latices obtained have a solid content of at most 35% and besides troublesome deposits may form in the polymerization apparatus.

It is also known to disperse the monomer finely in water in the presence of small to medium quantities of an emulsifier with the application of great shearing forces and then to polymerize it in the presence of an oil-soluble activator. That process is relatively complicated and requires much time and a considerable outlay on plant.

The present invention provides a new method of emulsion polymerization which enables stable latices of a solid content of about 45% and an average particle size of about 0.3 to 1.2μ to be obtained in a very elegant way even under the conditions under which latices are prepared on an industrial scale. The latices that are thus obtained can be worked up into a paste with a plasticizer, for example, a phthalic acid ester such as dioctyl phthalate, a dicarboxylic acid ester such as dioctyl or didecyl adipate or an ester of a higher monocarboxylic acid and a higher alcohol such as the ethyl hexyl ester of soy bean fatty acid. The pastes that are thus obtained have a particularly low viscosity and an excellent stability when stored and they are in particular required for centrifugal casting.

The process of the present invention is characterized by the fact that an emulsifier is used which is readily soluble in an organic medium and which has a very great wetting effect when applied in an aqueous solution.

By an emulsifier that is readily soluble in an organic medium there is to be understood an emulsifier, at least 30 grams or, preferably at least 50 grams of which dissolve in 100 grams of benzene at 25° C. By an emulsifier having a very great wetting effect is to be understood an emulsifier whose surface tension in an aqueous salt-free solution of 0.05% strength, determined by means of a stalagmometer according to Traube, is at most 32, preferably at most 29 dynes/cm. This method has been described e.g. by Traube, Berichte 20, 2644 (1887), and by Manegold, "Allgemeine und angewandte Kolloidkunde" (1956), Strassenbau, Chemie und Technik Verlagsgesellschaft, Heidelberg, Seite 100.

As emulsifier having a good solubility in organic media and at the same time a very great wetting effect in an aqueous solution and which are consequently suitable for use in the process of the invention there may be mentioned, for example, the di-esters of sulfosuccinic acid of the following general formula

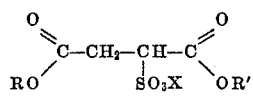

in which R and R' are straight chain or branched, preferably saturated, aliphatic or cycloaliphatic hydrocarbon radicals containing about 8 to 20, preferably 10 to 18 carbon atoms and which may contain the grouping

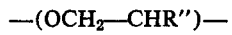

R" being an aliphatic hydrocarbon containing 1 to 5 carbon atoms or hydrogen; R' may also be a polyglycol radical containing 1 to about 100 members of the formula —(OCH$_2$—CHR")— or a polyhydric alcohol containing up to 20 carbon atoms and partially esterified with saturated or unsaturated fatty acids containing 6 to 20 carbon atoms, for example, glycerol, sorbitol, hexitol, erythritol or pentaerythritol, and X is an alkali or ammonium ion. There may also be used mixtures of the above-mentioned sulfosuccinic acid esters with one another. As examples of emulsifiers of the aforesaid type there may also be mentioned compounds obtained by the additive combination of alkali bisulfites with esters of vinyl phosphonic acid with alcohols of medium or higher molecular weight, for example, alcohols containing 8 to 20 carbon atoms. Products based on polyglycol which, owing to their ratio of polar to non-polar portions of molecules, have the properties defined above may also be used as emulsifiers. Many of the usual emulsifiers, for example, certain alkyl sulfates, alkyl sulfonates or alkyl aryl sulfonates, which in most cases are not capable of sufficiently reducing the surface tension are not suitable.

The latices of homo- and copolymers of vinyl chloride which have been produced with emulsifiers of the aforesaid type are distinguished by an optimum particle size and extremely great mechanical stability and they can easily be conveyed by means of centrifugal pumps of usual construction. Whereas in the usual emulsion polymerization processes very small particles of an average maximum size of 0.2μ form, the polymer is obtained in the process of the present invention in the form of somewhat larger particles, namely particles having a size of about 0.5 to 0.8μ, and, as is known, it is exactly this particle size that is the condition of the formation of pastes of low viscosity.

The polymerization according to the invention is, for example, carried out as follows: An aqueous solution which contains 1.5 to 3% of one of the above-mentioned emulsifiers and about 0.02 to 0.2% by weight, calculated on the water, of a polymerization activator which preferably should be a water-soluble peroxide, for example, hydrogen peroxide, a persulfate, especially an alkali persulfate, for example, sodium or potassium persulfate, is introduced into an appropriate reaction vessel, for example, an autoclave provided with a stirrer. The solution is advantageously adjusted to a pH value of about 3 to 10 by the addition of an appropriate buffer substance. If desired, a reducing agent, for example, rongalite or an alkali hyposulfite may be added in a quantity of about ½ to ⅒ of the activator. The aqueous solution is then stirred at a speed of about 60 to 150 r.p.m. The monomer or monomers are introduced—if they are gaseous, which is generally the case with vinyl chloride, they are introduced preferably under pressure—and the mixture is heated to 40° to 60° C. When after about 8 to 12 hours the polymerization is complete the reaction may be interrupted and the polymer can be worked up as will be described below. Alternatively, and this is the preferred way of carrying out the process of the invention, the latex may be removed from the reaction vessel continuously or in portions and adequate quantities of the aqueous solution and the monomer may be added. It is, however, suitable to introduce an aqueous solution of the emulsifier and an aqueous solution of the activator separately. If the process is carried out continuously the commencement of the reaction can, if desired, be facilitated by placing a polymerized latex instead of the aqueous solution into the reaction vessel.

The latex that is thus obtained is worked up into a pulverulent product by being sprayed into a gaseous medium, for example, a current of air having an elevated temperature, for example, at about 100° to 150° C. Before the latex is sprayed one adds thereto about 0.2 to 4% of an ester of (a) polyhydric alcohols, for example, sorbitol, pentaerythritol, glycerol, diglycerol or hexitol, and (b) 1 to 3 mols of a fatty acid. The same effect is obtained if one adds to the latex about 0.2 to 4% of either (a) a polyglycol ether of one of the aforesaid alcohols or a semi-ester thereof, (b) a phosphoric acid ester or a phthalic acid ester of an alcohol of medium or higher molecular weight containing about 6 to 20 carbon atoms, (c) a polyglycol ester of a semi-ester, i.e., partial ester, of an alcohol as mentioned above, and (d) a polyglycol ester of phosphoric acid, or phthalic acid. The degree of oxalkylation of these compounds may vary within very wide limits. It may, for example, vary from 1 to 100 mols of alkylene oxide per 1 mol of ester.

The aforesaid substances have the effect of covering the particles like wax and they impart to the pastes prepared from the polymers a viscosity of extraordinary stability during storage. Besides, when the polymers are worked up they act as auxiliary gelatinizing agents.

It is suitable to add these substances to the polymer latex in the form of their alcoholic solutions, for example, in methanol or ethanol or in another solvent which is miscible with water to a high degree.

Polymers which can be prepared by the process of the invention are polyvinyl chloride and copolymers of vinyl chloride containing at most 20% of one or more monomers that are copolymerizable with vinyl chloride, for example, esters of vinyl alcohol with saturated or unsaturated fatty acids, such as vinyl acetate, vinyl laurate or vinyl stearate; vinylidene chloride; acrylic acid esters of straight chain or branched aliphatic alcohols containing about 1 to 12 carbon atoms, for example, methyl acrylate, ethyl acrylate, decyl acrylate, 2-ethylhexyl acrylate, octyl acrylate, butyl acrylate, or the corresponding esters of maleic and fumaric acid.

The following examples serve to illustrate the invention but they are not intended to limit it thereto.

EXAMPLE 1

Vinyl chloride, an aqueous solution of 2% strength of di-isononyl-sulfosuccinic acid ester serving as emulsifier and an activator solution, which in one case was a potassium persulfate solution, in another case an ammonium persulfate solution and in a third case a hydrogen peroxide solution, were separately introduced by means of a dosing machine into a tall stirring autoclave of 50 litres capacity, in the upper part of which a blade stirrer rotated at a speed of 70 to 90 r.p.m. The substances were introduced in such quantities that equal portions of the emulsifier solution and vinyl chloride were brought together. The polymerization was carried out at a temperature within the range of about 42 to 44° C., the aforesaid substances being added continuously, and at the lower end of the stirring autoclave corresponding quantities of the polyvinyl chloride latex that had formed were drawn off continuously. The latex contained 45% of solid substances. It had a surface tension of 29 dynes/cm., an average particle size of $0.6\mu$ (determined by means of an electron microscope) and was mechanically very stable and could be conveyed by means of centrifugal pumps.

Before the latex was sprayed 3% of diglycerol monostearate was added to it. The product that was then sprayed had a paste viscosity of 7500 centipoises (determined in a rotation viscosimeter with a mixture of 60 parts of polyvinyl chloride and 40 parts of dioctylphthalate) and was so stable when stored that even after a storage of 28 days the viscosity of the paste increased to no more than about 12,000 centipoises. Without the addition of diglycerol monostearate the viscosity of the paste which in the beginning was 8000 centipoises increased to 15,000 centipoises after a storage of only 8 days.

EXAMPLE 2

The experiment was carried out in the manner described in Example 1 with the exception that an aqueous solution of 1.8% strength of di-isodecyl sulfosuccinic acid ester was used as emulsifier in the same proportion. A polyvinyl chloride latex was obtained which had a solid content of 45%, a surface tension of 27 dynes/cm. and an average particle size of $0.8\mu$. The following table indicates the viscosity the pulverulent polyvinyl chloride obtained by direct spraying of the latex had when it was sprayed without an additive and the viscosity it had when it was sprayed after 1% of diglycerol monostearate had been added.

Table

| Spraying | Viscosity of the paste in centipoises (ratio of polyvinyl chloride to dioctyl phthalate 60:40 after— | | |
|---|---|---|---|
| | 1 day | 8 days | 28 days |
| Without an additive | 8,500 | 13,900 | 20,000 |
| With the addition of 1% of diglycerol, monostearate | 6,950 | 10,000 | 11,600 |

The table clearly shows that the additive has a stabilizing effect on the viscosity of the paste. The values were measured at the lowest number of revolutions of the viscosimeter. When the number of revolutions was increased the viscosity was further reduced.

EXAMPLE 3

The experiment was carried out in the manner described in Example 1 with the exception that the emulsifier, which was used in the same proportion as in Example 1, was in one case an aqueous solution of 1.5% strength of the compound obtained by the additive combination of sodium bisulfite with the vinyl phosphonic acid ester of n-decyl alcohol, in another case an aqueous solution of 1.5% strength of the compound obtained by the additive combination of sodium bisulfite with the vinyl phosphonic acid ester of isotridecyl alcohol and in third case an aqueous solution of 1.5% strength of the compound obtained by the additive combination of sodium bisulfite with the vinyl phosphonic acid ester of cetyl alcohol. The latices obtained had a solid content of 43 to 45%, a surface tension of less than 30 dynes/cm. and average particle sizes of 0.5 to $0.8\mu$. The sprayed latices could well be made into pastes of good flowability and of viscosities within the range of 5000 to 8000 centipoises, which when prior to spraying a surface covering agent was added according to Example 1 or 2 were very stable during storage.

EXAMPLE 4

The experiment was carried out in the manner described in Example 1 with the exception that a different emulsifier was used. The emulsifier was used in the same proportion as in Example 1. The experiment was carried out several times and the following compounds were used as emulsifiers:

(a) An aqueous solution of 2% strength of the polyglycol ether obtained from 8 to 10 mols of ethylene oxide and 1 mol of isobutyl phenol;

(b) An aqueous solution of 2% strength of the polyglycol ether obtained from 8 to 10 mols of ethylene oxide and 1 mol of isononyl phenol;

(c) An aqueous solution of 2% strength of the polyglycol ether obtained from 10 mols of ethylene oxide and 1 mol of isodecyl alcohol;

(d) An aqueous solution of 2% strength of the polyglycol ether obtained from 10 mols of ethylene oxide and 1 mol of isotridecyl alcohol;

(e) An aqueous solution of 2% strength of the polyglycol ether obtained from 10 mols of ethylene oxide and 1 mol of lauric acid;

(f) An aqueous solution of 2% strength of the polyglycol ether obtained from 10 mols of ethylene oxide and 1 mol of stearic acid;

(g) An aqueous solution of 2% strength of the polyglycol ether obtained from 10 mols of ethylene oxide and 1 mol of sebacic acid.

As polymerization initiator a redox system prepared from a solution of potassium persulfate and sodium dithionite was used and the pH value was adjusted to 8.0 to 8.5 by means of sodium bicarbonate.

In cases in which the stabilizing effect on the latex was not sufficient the stability of the latex was increased by adding the same emulsifier or another one of the above-indicated sulfosuccinic acid esters in a concentration of up to 0.5%, calculated on the polymer, to the latex. The introduction of the additional emulsifier was brought about continuously in a mixing device in an aqueous solution of about 10% strength, the additional emulsifier being added to the latex after the latter had been drawn off from the reaction vessel and as it passed through the mixing device and before it was relieved from pressure. When the latices that were thus obtained were sprayed the viscosity of the pastes was stabilized in the same manner as in the preceding examples.

EXAMPLE 5

The experiment was carried out as described in Examples 1 to 4 and the diglycol monostearate serving as viscosity stabilizer was replaced in one case by the same quantity of diglycerol sesquioleate, in another case by the same quantity of pentaerythritol monolaurate and in a third case by the same quantity of sorbitan monostearate. The same stability of storage was obtained.

EXAMPLE 6

A latex prepared as described in Example 1, containing 45% of polyvinyl chloride and having a surface tension of 30 dynes/cm. was stirred with a methanolic solution of 30% strength of the polyglycol ether of 1 mol of pentaerythritol monolaurate and 35 mols of ethylene oxide in such a manner that the dry product obtained after the spraying contained 1% of this covering agent.

A paste prepared from 60 parts of this product and 40 parts of dioctyl phthalate had a viscosity of 6000 centipoises which within 28 days increased to no more than 9000 centipoises whereas the viscosity of a product that did not contain a covering agent increased to 17,000 centipoises in the same period.

EXAMPLE 7

The experiment was carried out as described in Example 6 with the difference that a methanolic solution of 50% strength of the polypropylene glycol ether from 50 mols of propylene oxide and 1 mol of diglycerol distearate was used.

The viscosity of a paste prepared from such a latex was within the range of 5000 centipoises after one day and 10,000 centipoises after 28 days at 20° C.

EXAMPLE 8

The experiment was carried out as described in Example 6 with the difference that a methanolic solution of 50% strength of monobutyl-di-ethylhexyl phosphate was used. The said phosphate was added in such a quantity that the dry product contained 0.7% of this covering agent. The paste had a viscosity of 6500 centipoises which within 28 days increased to no more than 9000 centipoises.

EXAMPLE 9

A polyvinyl chloride latex of 45% strength and an average particle size of $0.6\mu$ was covered with a methanolic solution of 30% strength of the polyglycol ester obtained from 1 mol of dibutyl phosphoric acid ester and 8 mols of ethylene oxide. The dry powder which was obtained after the spraying and which contained 0.5% of the covering agent had similar paste properties as the product obtained by the experiment described in Example 8.

EXAMPLE 10

An ester product obtained from a polyethylene glycol having a molecular weight of 2000 and phosphoric acid dilauryl ester in a molar proportion of 0.5:1 was used in a concentration of 1% strength to cover a polyvinyl chloride latex. The polyvinyl chloride paste containing a plasticizer was distinguished by an excellent stability during storage.

EXAMPLE 11

A methanolic solution of 50% strength of an esterification product obtained from phthalic acid monooctyl ester and polypropylene glycol (molecular weight 6,000) in a molar ratio of 1:0.8, was used in such a quantity for covering a polyvinyl chloride latex of 45% strength that after the spraying the dry product contained 2% of the waxy substance. A paste prepared from 60 parts of polyvinyl chloride and 40 parts of dioctyl phthalate had an initial viscosity of 6,000 centipoises which after a storage of 28 days increased to 10,000 centipoises.

I claim:

1. A process for the manufacture of a vinyl polymer in a form having unique paste-forming properties which comprises polymerizing in an aqueous emulsion a member selected from the group consisting of vinyl chloride and a mixture of vinyl chloride with up to 20% by weight of the mixture of a comonomer selected from the group consisting of a fatty acid ester of vinyl alcohol, vinylidene chloride and an acrylic acid ester of an aliphatic alcohol containing 1–12 carbon atoms, a maleic acid ester of an aliphatic alcohol containing 1–12 carbon atoms, and a fumaric acid ester of an aliphatic alcohol containing 1–12 carbon atoms, said polymerization being conducted in the presence of an emulsifier which is soluble to the extent of at least 30% by weight in benzene at 25° C. and the aqueous solution of which has a surface tension of at most 32 dynes/cm. as measured with the Traube-stalagmometer, whereby a polymer latex is formed having a polymer particle size of about 0.5–0.8 micron, then adding to said polymer latex 0.2–4% by weight, based on the weight of the polymer, of a wax-like coating agent selected from the group consisting of fatty acid esters of polyhydric alcohols, polyglycol ethers of polyhydric alcohols and semi-esters thereof, phosphoric acid esters of monohydric alcohols containing 6–20 carbon atoms, phthalic acid esters of monohydric alcohol containing 6–20 carbon atoms, polyglycol esters of phosphoric acid, and polyglycol esters of phthalic acid, and subsequently spray drying the resulting polymer latex.

2. The process of claim 1, wherein the emulsifier is a sulfosuccinic acid ester.

3. The process of claim 1, wherein the emulsifier is the addition product of an alkali bisulfite and a vinyl phosphonic acid ester.

4. The process of claim 1, wherein the coating agent is a fatty acid ester of a polyhydric alcohol.

5. The process of claim 1, wherein the coating agent is a polyglycol ether of a polyhydric alcohol.

6. The process of claim 1, wherein the coating agent is an ester of an aliphatic alcohol and an acid selected from the group consisting of phosphoric acid and phthalic acid.

7. The process of claim 1 wherein the coating agent is a polyglycol ether of a partial ester of an alcohol with 6 to 20 carbon atoms and an acid selected from the group consisting of phosphoric acid and phthalic acid.

8. The process of claim 1 wherein the coating agent is a polyglycol ether of pentaerythritol monolaurate.

9. The process of claim 1 wherein the coating agent is a polyglycol ether of diglycerol distearate.

References Cited by the Examiner

UNITED STATES PATENTS

| | | | |
|---|---|---|---|
| 2,624,724 | 1/53 | Park | 260—92.8 |
| 2,689,836 | 9/54 | Bier | 260—29.6 |
| 2,711,999 | 6/55 | Brandner et al. | 260—31.8 |
| 2,772,256 | 11/56 | Manganelli | 260—2.5 |
| 2,772,257 | 11/56 | Manganelli | 260—31.8 |
| 2,772,258 | 11/56 | Manganelli | 260—31.8 |
| 2,844,486 | 7/58 | Lamar | 106—308 |
| 2,852,482 | 9/58 | Graham | 260—31.8 |
| 2,948,638 | 8/60 | Baird et al. | 260—29.6 |

OTHER REFERENCES

Perry: "Chemical Engineers' Handbook," 3rd edition (1950), McGraw-Hill Book Company, pages 838–848, especially page 838.

Quinn: American Ink Maker, February 1959, page 30.

MORRIS LIEBMAN, Primary Examiner.

DANIEL ARNOLD, LEON J. BERCOVITZ, ALEXANDER H. BRODMERKEL, Examiners.